(12) United States Patent
Aggarwal et al.

(10) Patent No.: US 12,363,032 B2
(45) Date of Patent: Jul. 15, 2025

(54) OVERLAY SCHEME FOR CONTAINER ADDRESSING IN VIRTUAL NETWORKS

(71) Applicant: Microsoft Technology Licensing, LLC, Redmond, WA (US)

(72) Inventors: Neha Aggarwal, Kirkland, WA (US); Chandan Aggarwal, Kirkland, WA (US); Rishabh Tewari, Sammamish, WA (US); Abhijeet Kumar, Sammamish, WA (US); Sudhir Goel, Kirkland, WA (US); Trilok Nuwal, Redmond, WA (US); Matthew Francis Long, Seattle, WA (US); Evan Alexander Baker, Nashville, TN (US); Aanand Ramachandran, Sammamish, WA (US); Alok Upadhyay, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 456 days.

(21) Appl. No.: 18/047,345

(22) Filed: Oct. 18, 2022

(65) Prior Publication Data

US 2024/0129231 A1    Apr. 18, 2024

(51) Int. Cl.
*H04L 45/64* (2022.01)
*H04L 45/74* (2022.01)
*H04L 45/76* (2022.01)

(52) U.S. Cl.
CPC .............. *H04L 45/64* (2013.01); *H04L 45/74* (2013.01); *H04L 45/76* (2022.05)

(58) Field of Classification Search
CPC ......... H04L 45/64; H04L 45/74; H04L 45/76; H04L 45/586
See application file for complete search history.

(56) References Cited

U.S. PATENT DOCUMENTS

2019/0173888 A1* 6/2019 Li ........................... H04L 67/10
2020/0099653 A1* 3/2020 Strauss ............... H04L 61/2592
(Continued)

OTHER PUBLICATIONS

"Cluster Networking", Retrieved from: https://kubernetes.io/docs/concepts/cluster-administration/networking/, Oct. 24, 2022, 1 Page.
(Continued)

*Primary Examiner* — Walli Z Butt
(74) *Attorney, Agent, or Firm* — Holzer Patel Drennan

(57) ABSTRACT

A virtual network provider system supports a virtual network including virtual machines that are each assigned to an underlay address of an underlay addressing scheme. The virtual network provider system further includes multiple routing domains each defined to include a different subset of the virtual machines. Each of the routing domains is assigned to a range of overlay addresses of an overlay addressing scheme. For each routing domain, the assigned range of overlay addresses is allocated among the subset of the virtual machines in the routing domain. The system further includes a virtual network host configured to use addresses of the overlay addressing scheme to selectively route messages between endpoints on select pairs of the virtual machines assigned to a same routing domain of the plurality of routing domains.

20 Claims, 6 Drawing Sheets

(56) References Cited

U.S. PATENT DOCUMENTS

2021/0092092 A1\* 3/2021 Lo .................... H04L 12/4641
2021/0377128 A1\* 12/2021 Kapadia ............... H04L 9/0894

OTHER PUBLICATIONS

"Deep Dive into Cilium Multi-cluster", Retrieved from: https://cilium.io/blog/2019/03/12/clustermesh/, Mar. 18, 2019, 13 Pages.
"Overlay networking", Retrieved from: https://web.archive.org/web/20220815080306/https://projectcalico.docs.tigera.io/networking/vxlan-ipip, Aug. 15, 2022, 5 Pages.
Cat, et al., "What is Application Gateway Ingress Controller?", Retrieved from: https://learn.microsoft.com/en-us/azure/application-gateway/ingress-controller-overview, Mar. 3, 2021, 3 Pages.

\* cited by examiner

OVERLAY SCHEME FOR CONTAINER ADDRESSING IN VIRTUAL NETWORKS

BACKGROUND

Some cloud-based providers offer services that allow customers to configure and run applications on cloud-hosted virtual machines. Customer demand for highly-scalable virtual networks has led to the roll-out of various network virtualization services, such as Microsoft's Azure Kubernetes Services (AKS), which allows customers to deploy, scale and manage containers and container-based applications across a cluster of container hosts that operate within a customer-specific virtual network to run various processes.

In some applications such as AKS, it is desirable to facilitate container-to-container communications. Since these containers may exist on the same subnet, potentially being executed by the same host machine, the host's internet protocol (IP) address is not a unique identifier usable address communications to the individual containers. One way of assigning the containers unique IPs is to utilize an overlay address scheme. An overlay address scheme typically enables point-to-point communications using a range of addresses that are "non-routable" within their respective networks, meaning that the overlay addresses are not recognized by the programmable network components, such as switches and routers, that are used to transmit the communication between the endpoints.

There exist various mechanisms for implementing overlay addressing schemes. Some overlay address schemes rely on routing tables to define how traffic is routed within a network. For example, a routing table may be used to map overlay addresses (e.g., used as container IPs) to routable IP addresses of corresponding host virtual machines. However, routing tables are typically size-limited with an upper cap set by the supporting platform. For example, Azure User Defined Routing (UDR) is a subnet-level routing scheme that supports a maximum limit of 400 routes, meaning routing is supported between a maximum of 400 nodes and the corresponding containers on such nodes. In certain applications, customers have computing needs best met by large numbers (e.g., hundreds or thousands) of nodes collectively deploying millions of containers.

Other forms of overlay addressing systems use some sort of "encapsulation," or software encoding, that markets the data before it is taken to its destination. When an encapsulated message reaches its destination, this encapsulated message is unwrapped and delivered to the destination it was intended for. However, the process of encapsulating and unwrapping messages requires compute power and reduces throughput due to additional encapsulated data being added to each packet. Therefore, encapsulation is not an ideal solution for data communications associated with throughput-sensitive applications.

SUMMARY

According to one implementation, a method of routing messages between containers in a virtual network includes configuring a cluster of virtual machines on the virtual network. The method further includes assigning the virtual machines of the cluster to a select routing domain. The routing domain is one of multiple routing domains defined within the virtual network that are each assigned a range of overlay addresses of an overlay addressing scheme consisting of addresses that are non-routable within virtual network. At least two of the multiple routing domains in the virtual network are assigned to overlay ranges of the overlay addresses. The method further includes assigning each of the virtual machines of the cluster to a unique subset of the range of overlay addresses assigned to the routing domain. Addresses of the overlay addressing scheme are used to selectively route messages between endpoints on select pairs of the virtual machines within the cluster.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology provides a highly scalable overlay addressing scheme that effectively allows an individual cloud customer to deploy millions of individually-addressable containers within a virtual network. The disclosed addressing scheme is created by partitioning the virtual network into multiple self-contained "routing domains" inside of which an individual customer workload can be executed in containment. This scheme logically extends the available virtual network address space by permitting concurrent and duplicative use of overlay addresses within different routing domains for containers that do not communicate with one another.

In one implementation, each routing domain in a virtual network is assigned a range of overlay addresses defined within overlay addressing scheme. The range of overlay addresses assigned to each routing domain is further partitioned into different subsets of addresses that are each respectively assigned to one of the virtual machines within the routing domain. Consequently, each virtual machine has accesses to a subset of overlay addresses available for assignment to its container-based applications that allow for unique identification of those applications within the corresponding routing domain.

As mentioned above, some duplicity is permitted in the overlay addresses that are used in within different routing domains in order to facilitate availability of large numbers of unique overlay addresses within each routing domain. As is explored with respect to the following figures, one consequence of this duplicity is that the overlay addressing scheme is incapable of supporting communications between endpoints in different routing domains. However, the repeated use of some of the overlay addresses in different routing domains of the same virtual network translates to availability of a millions of addressable endpoints within the same virtual network.

Notably, the above-described constraint prohibiting use of the overlay address scheme to support communications across routing domains does not impede the utility that the disclosed overlay addressing scheme can provide in certain applications, such as applications that facilitate deployment clusters of virtual machines and corresponding containers in support of each of various self-contained customer workloads. In one implementation, the disclosed technology allows different customer workloads to be supported by and contained within different routing domains. Since the customer processes are independent, there is no need for communications between endpoints within the different routing domains. Therefore, the above-mentioned "inter-domain" constraint of the disclosed overlay scheme has essentially no impact.

Figure 1:
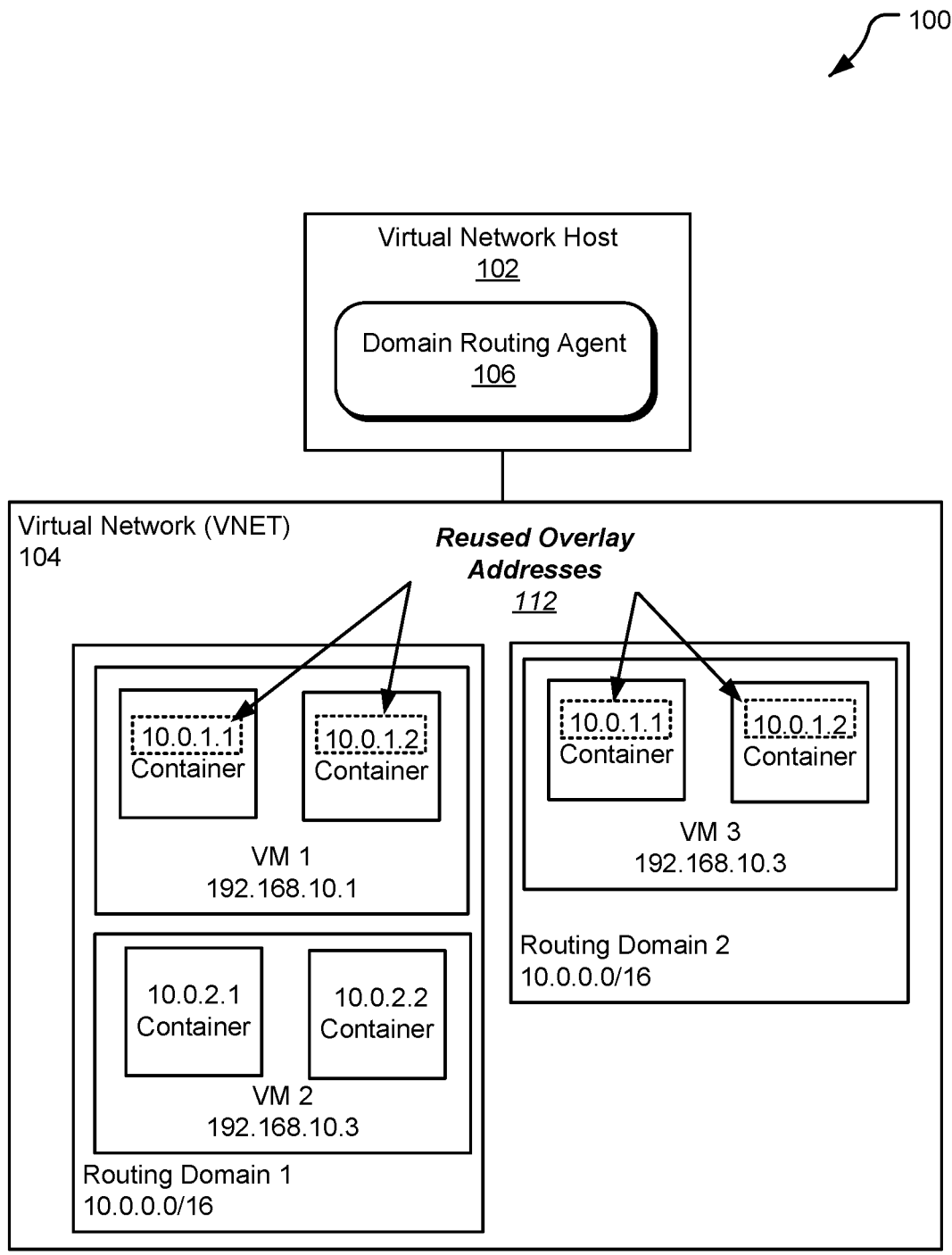
FIG. 1 illustrates aspects of a cloud-based virtual networking system that uses routing domains to define a highly-scalable overlay addressing scheme that facilitates container-to-container communications within a virtual network.

FIG. 1 illustrates aspects of a virtual network provider system 100 that uses routing domains to define a highly-scalable overlay addressing scheme that facilitates container-to-container communications within a virtual network 104. In FIG. 1, the virtual networking system 100 includes a virtual network host 102 that receives and routes communications sent to and from various virtual machines in a virtual network 104. In one implementation, there is a default "route" programmed on each virtual machine that directs all traffic leaving the virtual machine to the virtual network host 104. For simplicity, the virtual network 104 is shown to include three virtual machines (e.g., VM1, VM2, VM3); however, the virtual network 104 may include any number of machines (e.g., hundreds or even thousands). Each of the virtual machines in the virtual network 104 functions as a virtual computer system with its own CPU, memory, network interface, and storage.

Although the virtual network 104 does not illustrate physical servers, each virtual machine within the virtual network 104 is hosted by a physical server. Different virtual machines within the virtual network 104 may be hosted by the same or different servers and/or at servers at the same or different physical locations. Each of the virtual machines within the virtual network 104 is uniquely identifiable within the virtual network 104 by an IP address that is of a common addressing scheme referred to herein as an "underlay addressing scheme." As used herein, an underlay addressing scheme refers to a set of IP addresses used by the virtual network ("VNet addresses" or "underlay addresses") that are assigned to endpoints that are routable between the endpoints due to the fact that the programmable components within the virtual network 104, including routers, switches, and the physical servers, are capable of mapping the overlay addresses to the various device endpoints. In the example of FIG. 1, each of the virtual machines in the virtual network 104 is part of a same subnet, with IP address 192.168.10.1, 192.168.10.2, and 192.168.10.3, respectively; however, being on the same subnet is not a requirement of virtual machines within a same virtual network.

Each of the virtual machines within the virtual network 104 may execute one or more different containers or container-based applications ("containers"), where "container" in this sense refers to a standard unit of software that packages up application code and all its dependencies so the application runs quickly and reliably regardless of the characteristics in the computing environment external to the container. One example of a container is a Docker container image, which is a standalone executable package of software that includes everything needed to run an application including the application code, code executable to create a runtime environment for the application, system tools, system library and settings.

FIG. 1, each of the three virtual machines (VM1, VM2, and VM3) is shown hosting two different containers. In actual implementations, a virtual machine may host any number of containers. In some applications, there may exist thousands or millions of containers executing on the various virtual machines of the virtual network 104. Each time a container is instantiated on a virtual machine within the virtual network 104, the container is assigned an identifier (an "overlay address") that is selected from an overlay addressing scheme. The overlay addressing scheme consists of addresses that are non-routable within the underlay addressing scheme used by the virtual network 104. For example, VM 1 has an underlay address 192.168.10.1 and hosts two different containers with overlay addresses 10.0.1.1 and 10.0.1.2, respectively. In can be assumed that the routing hardware (e.g., routers and switches) supporting the virtual network 104 do not have a way of mapping the addresses of the overlay address scheme to physical endpoints but that these same components are capable of mapping the addresses of the underlay addressing scheme to physical endpoints.

To support reusability of overlay addresses and thereby vastly increase the scalability of addressable endpoints within the virtual network 104, virtual machines of the virtual network 104 are partitioned into different routing domains. By example, FIG. 1 illustrates two routing domains including "Routing Domain 1" that includes VM1 and VM2 and "Routing Domain 2" that includes VM 3. In various implementations, the different routing domains may support have any number of different virtual machines. Virtual machines may be partitioned evenly or unevenly among the different routing domains of the virtual network 104.

In one implementation, each routing domain in the virtual network is assigned to a subset of overlay addresses that are defined within an overlay address scheme. The subset of overlay addresses assigned to a routing domain is independent of the subset assigned to all other routing domains in the Vnet in the sense that different routing domains could be assigned to completely different, overlapping, or identical subsets of the overlay addresses. For example, each routing domain is assigned one CIDR (a block of addresses that is independent of the CIDR used in other routing domains). The subset of addresses assigned to each routing domain is further divided into smaller non-overlapping subsets of addresses that are each respectively assigned to one of the virtual machines within the routing domain. When a container is instantiated on a virtual machine, the container is assigned a single overlay address from the subset of overlay addresses previously assigned to the virtual machine hosting the container. In this sense, each container executing within a same routing domain is assigned an overlay address that is guaranteed to be unique within the corresponding routing domain.

To abstract this into an easy-to-understand example, assume the overlay addressing scheme is defined by addresses in the form of individual alphabetical letters A-Z where each letter represents one address. If Routing Domain 1 includes two virtual machines and is assigned to the range of overlay addresses A-L, then the two virtual machines are assigned non-overlapping subsets of this range, such as A-F for the first virtual machine and G-L for the second virtual machine. In this case, the first virtual machine can instantiate up to 6 uniquely-identifiable containers addressed by A-F, while the second virtual machine could likewise instantiate up to 6 of its own uniquely-identifiable containers, addressed G-L.

Notably, the ranges of overlay addresses assigned to different routing domains in the virtual network 104 may in some cases be identical or overlapping. In the case of the simplified alphabetical example above, Routing Domain 1 and Routing Domain 2 could both be assigned the range A-L or other ranges with some overlapping addresses.

In one implementation, each routing domain in the virtual network 104 assigned a classless inter-domain routing (CIDR) block of addresses, commonly known as a "CIDR block" (in lieu of the range of alphabetical letters in the above example). Consistent with the above example where overlay addresses may be "re-used" in different routing domains, Routing Domain 1 and Routing Domain 2 are, in the example of FIG. 1, assigned identical CIDRs (e.g., blocks 10.0.0.0/16). Notably, use of the same overlay address range in different routing domains is permissible but not a requirement. Different routing domains may also be assigned non-overlapping and partially overlapping ranges of overlay addresses. Although not shown in FIG. 1, it may be assumed that the individual VMs in this example are assigned subblocks of the overlay addresses from the CIDR of the associated routing domain (e.g., individual VMs are assigned subblocks such as 10.0.1.0/16, 10.0.2.0/16, etc.) and the containers hosted by each VM are each assigned a single address from the subblock assigned to the host VM.

Due to the duplicative assignment of the same overlay address block, CIDR block 10.0.0.0/16, in both of Routing Domain 1 and Routing Domain 2, one or more containers executing on VM3 (in Routing Domain 2) are assigned a same overlay address as another container executing on VM1 (in Routing Domain 1), as shown in FIG. 1 by "reused overlay addresses 112." This duplicity is permissible because the architecture of the virtual network provider system 100 does not support communications between the containers in different routing domains.

In the virtual network provider system 100, the virtual network host 102 acts as an intermediary that receives and routes all messages originating at virtual machine endpoints. The virtual network host 102 includes a domain routing agent 106 with access to a routing table (not shown) identifying the range of overlay addresses assigned to each different routing domain and to each virtual machine within each of the routing domains. Consequently, the domain routing agent 106 can quickly identify whether each outbound message is directed to an overlay address that exists within the same routing domain as the routing domain where the message originated. If so, the domain routing agent 106 uses the table to identify a destination virtual machine and delivers the message to the destination virtual machine. Upon receiving an incoming message, a destination virtual machine directs the message to the container with the overlay address matching the destination field in the message header.

In this sense, the overlay addresses may be used exclusively to support transmission of "intra-domain messages," meaning messages that have a source address ("from") and a destination address ("to") that are in a same routing domain. In contrast, the disclosed scheme does not support use of the overlay address scheme to deliver inter-domain messages, meaning messages that have endpoints in different routing domains.

Despite the above-described constraint that limits use of the overlay addressing scheme to intra-domain messaging, there exist applications where the burden of this constraint is significantly outweighed by the increased scalability arising from the potential for duplicative uses of the same overlay addresses within different routing domains. In one example use case, a customer uses the virtual network provider system 100 to deploy a group of process that collectively represent a single workload. Each process in the workload is instantiated on a different container, and all of the containers supporting the workload are instantiated within a same routing domain. Since all processes of the workload are contained within a same routing domain, there is no need for the processes in the workload to communicate with processes external to the routing domain. At the same time, each individual routing domain can support a large number of individual overlay addresses that may all be concurrently assigned to different containers and the virtual network as a whole can support millions of uniquely addressable container endpoints.

Figure 2:
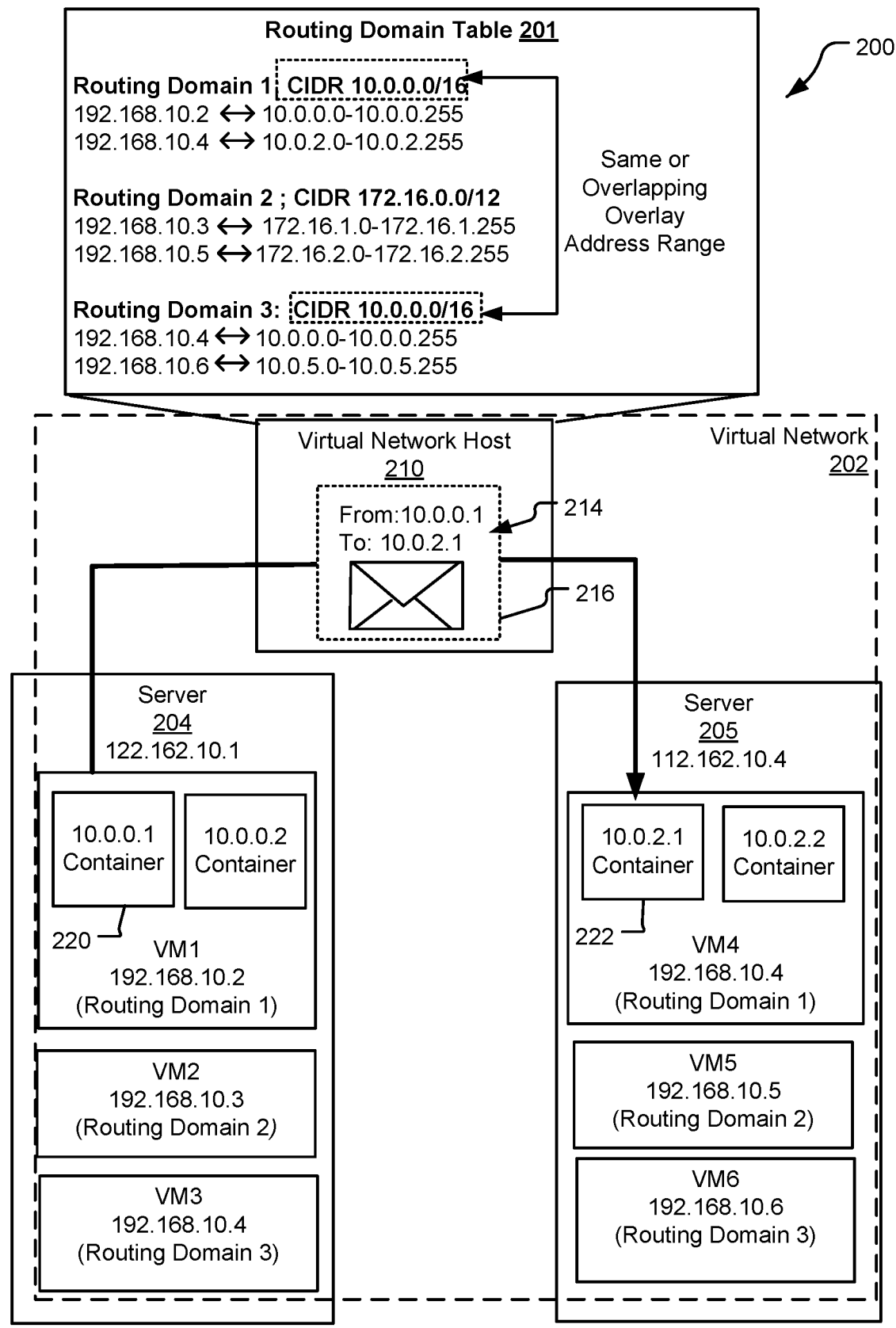
FIG. 2 illustrates aspects of a virtual network provider system that uses routing domains to define an overlay addressing scheme that facilitates communications between containers executing on virtual machines of a virtual network.

FIG. 2 illustrates aspects of a virtual network provider system 200 that uses routing domains to define an overlay addressing scheme that facilitates communications between containers executing on virtual machines of a virtual network 202. The virtual network provider system 200 is shown to include at least two servers 204 and 205 that are each identified by a corresponding IP address in a physical network (e.g., IP addresses 122.162.10.1 and 112.162.10.4). Although not shown, it is assumed that the server 204 and server 205 are connected to one another through one or more programmable switches and routers.

Each of the servers 204 and 205 serves as a physical host for multiple different virtual machines of the virtual network 202. Although the servers 204 and 205 may, in some implementations, host virtual machines for multiple different virtual networks, it is assumed that all virtual machines (VMs) shown in FIG. 2 are part of the same virtual network and hosted on behalf of the same customer.

The virtual network 202 includes multiple virtual machines—some hosted on servers 204 and 205. The virtual machines of the virtual network 202 are partitioned into multiple routing domains. In one implementation, a customer served by the virtual network 202 is provided with the option to self-configure individual routing domains (e.g., many at once or one at a time, as-needed). Although an individual routing domain could support many different customer applications, the customer may, for example, configure a routing domain to perform a collection of related tasks that effect a common goal (e.g., one workload). For example, the customer creates a "cluster" of virtual machines that are tasked with executing the workload, where all VMs in the cluster are to operate within a same routing domain.

In another implementation, the customer wants to run parallel instances of a same workload that requires processing-intensive tasks supported by many virtual machines. In this case, the user may configure a different cluster/routing domain for each different parallel instances of the workload. If, for example, the customer wants to run 1000 parallel instances of a same workload, the customer may provide an input indicating a selection of "1000" clusters, each being assigned to a different routing domain by the virtual network provider system 200.

The virtual network provider system 200 assigns each routing domain a block of overlay addresses (e.g., a large CIDR block, such as a \16 block that can store 65,536 addresses) to each different routing domain. In different implementations, the size of the overlay address block assigned to the different routing domains may be identical or non-identical and either set by the virtual network provider system 200 or by the customer.

When configuring the virtual network provider system 200, the customer may also be asked to specify a desired number of virtual machines, containers, and/or other parameters usably by the system to decide how to partition virtual machines available on the virtual network into the different routing domains. In one implementation, the virtual network provider system 200 assigns a set (default or user-selectable) number of virtual machines to each routing domain. In other instances, the virtual network provider system 200 sets a maximum number of virtual machines available within each routing domain but allows the customer to specify how many of these available virtual machines are to be used at a given time.

Each virtual machine within a given one of the routing domains is assigned a subblock of the range overlay address allocated to the corresponding routing domain. The subblock of overlay addresses assigned to each virtual machine is unique within the associated routing domain, meaning that no two virtual machine in a same routing domain are assigned a same or overlapping range of overlay addresses.

In one implementation, the size of the address subblock assigned to each virtual machine is static at set by the virtual network provider system 200. For example, the routing domain may have a CIDR block size of /16, which is a commonly-used notation to indicate that there are 65536 IP addresses available (i.e., in CIDR notation, the number of addresses available for use in is defined as $2^{(32-x)}$, where X is the number following the "/" in in the CIDR notation). In the above example where the routing domain is of size CIDR /16, each virtual machine may be allocated a subblock of this, such as a /24 size CIDR block holding 256 addresses. In this example, the routing domain could host up to 256 virtual machines that each have the capability of hosting up to 256 containers, all having an overlay addresses that are unique within the routing domain.

In FIG. 2, the server 204 is shown hosting three virtual machines—VM1, VM2, and VM3 while the server 205 is shown to be hosting another three virtual machines—VM4, VM5, and VM6. Each of these virtual machines VM1-VM6 is identified by an IP address in an underlay address scheme of the virtual network 202 (e.g., IP addresses that all share network ID 192.168.10). These IP addresses are "routable," meaning they are mapping to physical endpoints by the programmable routing components that perform message routing on behalf of the virtual network 202. In the example shown, VM1 and VM4 are both included in "Routing Domain 1," VM 2 and VM5 are both included in "Routing Domain 2," and VM3 and VM6 are both included in "Routing Domain 3."

A virtual network host 210 acts as an intermediary that performs all routing operations on behalf of the virtual network. In one implementation, a different virtual network host performs routing operations on behalf of each different virtual network hosted within the virtual network provider system 200.

In typical operations, the virtual network host 210 is executed on physical server that is different from the servers 204, 205. The virtual network host 210 has access to a routing domain table 201 maintained either by the virtual network host 210 or third party. The routing domain table includes a routing domain identifier for each routing domain (e.g., 1, 2, 3, . . . ) and additionally indicates the range of overlay addresses of the overlay address scheme that have been assigned to each routing domain. In FIG. 2, each of the three routing domains in the virtual network 202 is assigned a CIDR block of size /16. Routing Domain 1 and Routing Domain 3 have been assigned CIDR blocks spanning an identical address range.

In addition to indicating which overlay addresses are allocated to each routing domain, the routing domain table 201 further indicates which subblocks of the overlay addresses have been assigned to each virtual machine in the respective routing domains. In this example, each individual virtual machine is assigned a subblock of size CIDR /24, representing 256 addresses. Within the routing domain table 201, each virtual machine is identified by its corresponding underlay address which is mapped, in the table, to the assigned range of overlay addresses. For example, VM1 with underlay address 192.168.10.2 is shown to belong to Routing Domain 1 and also shown to be assigned 256 addresses that are included in the block of ~65 k overlay addresses assigned to Routing Domain 1 (e.g., addresses 10.0.0.0-10.0.0.255). Likewise, VM2 with underlay address 192.168.10.4 is shown to be included in Routing Domain 1 and assigned another 256 addresses from the block assigned to Routing Domain 1.

When a container-based customer application is instantiated within the virtual network, the virtual machine hosting the container assigns the container an overlay address from unique subblock of the routing domain's overlay addresses that are assigned to the virtual machine. Once an overlay address is assigned to a container, the address is no longer available for assignment within the associated routing domain until such time that the container ceases to exist. In this way, it is guaranteed that each container instantiated in a routing domain is assigned an overlay address that is unique within the routing domain that the container belongs to.

Figure 3:
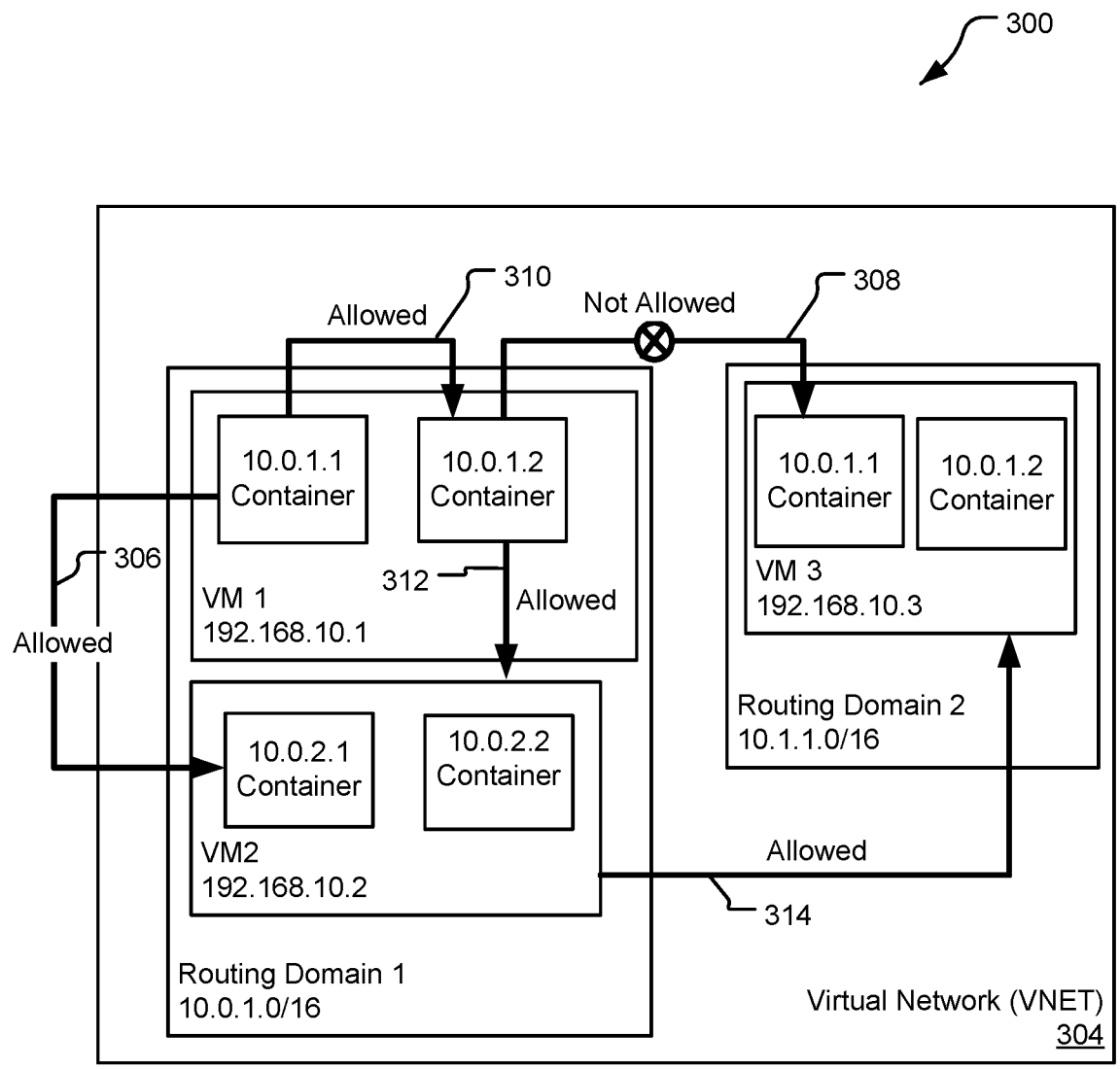
FIG. 3 illustrates examples of permissible and non-permissible communications in a system that utilizes routing domains to define an overlay addressing scheme used for routing messages within a virtual network.

Per the addressing scheme of FIG. 2, it is permissible for different routing domains in the virtual network to be assigned the same or overlapping ranges of addresses with the overlay address scheme. In FIG. 3, routing domains 1 and 3 are shown to be assigned identical CIDR blocks (e.g., CIDR 10.0.0/16). The virtual network host 210 implements routing logic that permits intra-domain (same-domain) communications using the overlay addressing scheme while prohibiting inter-domain communications that cross a routing domain boundary.

When a container executing on a virtual machine generates a message for transmission to another container, the message is created with source and destination addresses from the overlay addressing scheme included in the message header. The outgoing message is sent to the virtual network host 210, and the virtual network host 210 determines, by accessing the routing domain table 201, if the message is an intra-domain message (e.g., a message with source and destination endpoints in the same routing domain).

In the example shown in FIG. 2, a container 220 with overlay address 10.0.1.1. executing on VM1 generates a message 216 with a header information 214 that includes a source address of "10.0.0.1" and a destination address of "10.0.2.1. This message leaves the host virtual machine (VM1) and is directed to the virtual network host 210. The virtual network host 210 sees that the message 216 that has arrived from a machine with the underlay address of VM1 (192.168.10.2) and also sees that the destination address (10.0.2.1) of the message 216 is non-routable within the underlay address scheme. Since the message 216 is being routed to a non-routable IP address, the virtual network host 210 accesses the routing domain table 201 to determine what routing domain the message 216 has arrived from. In this case, the virtual network host 210 determines that the message 216 has arrived from a virtual machine with the underlay address 192.168.10.2, which is part of Routing Domain 1.

Following this, the virtual network host 210 confirms that the destination address 10.0.2.1 exists within the subset of overlay addresses assigned to Routing Domain 1. Since 10.0.2.1 is included in the CIDR block 10.0.0.0/16 (the overlay address block assigned to Routing Domain 1), the virtual network host 210 determines that the message 216 is a permissible intra-domain message. The virtual network host 210 then accesses further information in the routing domain table 201 to identify the underlay IP address of a destination virtual machine in Routing Domain 1. The destination virtual machine is assigned to a range of overlay addresses including the destination overlay address of 10.0.2.1. In this case, the destination virtual machine is VM4 with underlay IP address of 192.168.10.4.

The virtual network host 210 performs one final step of accessing a second look-up table (not shown) to determine the IP address of the physical server 205 (e.g., 112.162.10.4) hosting the virtual machine with the underlay address of 192.168.10.4. With this information, the virtual network host 210 forwards the message 216 to VM4 on server 205. Upon receipt of the message 216, VM4 determines that the destination address 10.0.2.1 in the message header corresponds to the overlay address assigned to a locally-executing container, container 222, and forwards the message directly to the container 222.

In the event that the virtual network host 210 receives an inter-domain message (e.g., determined to originate in a routing domain that does not include the destination address), the virtual network host 210 declines to deliver the message.

FIG. 3 illustrates examples of permissible and non-permissible communications in a system 300 that utilizes routing domains to define an overlay addressing scheme used for routing messages within a virtual network 304. In one implementation, the virtual network 304 is of the same general architecture and addressing scheme that disclosed with respect to any of FIG. 1-2. The virtual network includes a number of virtual machines that are partitioned between different routing domains. Each different routing domains is assigned a block of non-routable overlay addresses that is further divided into subsets. Each of these subsets of the address block is assigned to a virtual machine that has been instantiated within the routing domain. There may exist some overlap in the ranges of addresses assigned to different routing domains; however, the overlay addresses assigned to each virtual machine is unique within the routing domain (non-overlapping with the ranges assigned to other virtual machines in the same routing domain).

In one implementation, all messages originating on the virtual network 304 are transmitted to a virtual network host (not shown) that routes the messages to corresponding endpoints within the virtual network.

In the system 300, it is permissible to use the overlay addressing scheme to address messages exchanged between containers executing on different virtual machines. For example, a message 306 with a source address of 10.0.1.1 can be delivered to a destination address of 10.0.2.1 provided that the destination address exists within the same routing domain as the source address (as is true for the message 306).

However, the system 300 does not support use of the overlay addressing scheme to address messages between containers executing on virtual machines in different routing domains. For example, the virtual network host (not shown) is unable to deliver a message 308 with header information "From: 10.0.1.2/TO: 10.0.1.1" to a container on Routing Domain 2 with an overlay address of 10.0.1.1 because the message 308 originates in Routing Domain 1 and the virtual network host is not capable of routing inter-domain messages addressed using the overlay scheme.

In the system 300, it is also permissible to use the overlay scheme to address messages exchanged between containers executing on a same host virtual machine. Since both containers are in the same VM, the traffic is routed locally. For example, a message 310 originates on VM 1 and includes header information "From: 10.0.1.1/TO: 10.0.1.2." This message does not leave VM 1 because VM1 locally hosts a routing agent that intercepts the outgoing message before sending the message to the virtual network host. The routing agent on VM1 recognizes that the destination address of 10.0.1.1. is within the overlay range assigned to VM 1 and redirects the message to the locally-executing container with the overlay address of 10.0.1.1.

In still a further example, a message 312 with header information "From 10.0.1.2/TO: 192.168.10.2" is supported because the message 312 originates in Routing Domain 1 and is directed to a routable IP address. When the virtual network host (not shown) receives the message 312, it recognizes that the destination address 192.168.10.2 is routable (existing in the underlay addressing scheme) and the message is routed as shown. Likewise, a message 314 with header information "From: 192.168.10.2/TO: 192.168.10.3" is also supported. Although the message has endpoints in two different routing domains, the destination address is again a routable address within the underlay addressing scheme.

Figure 4:
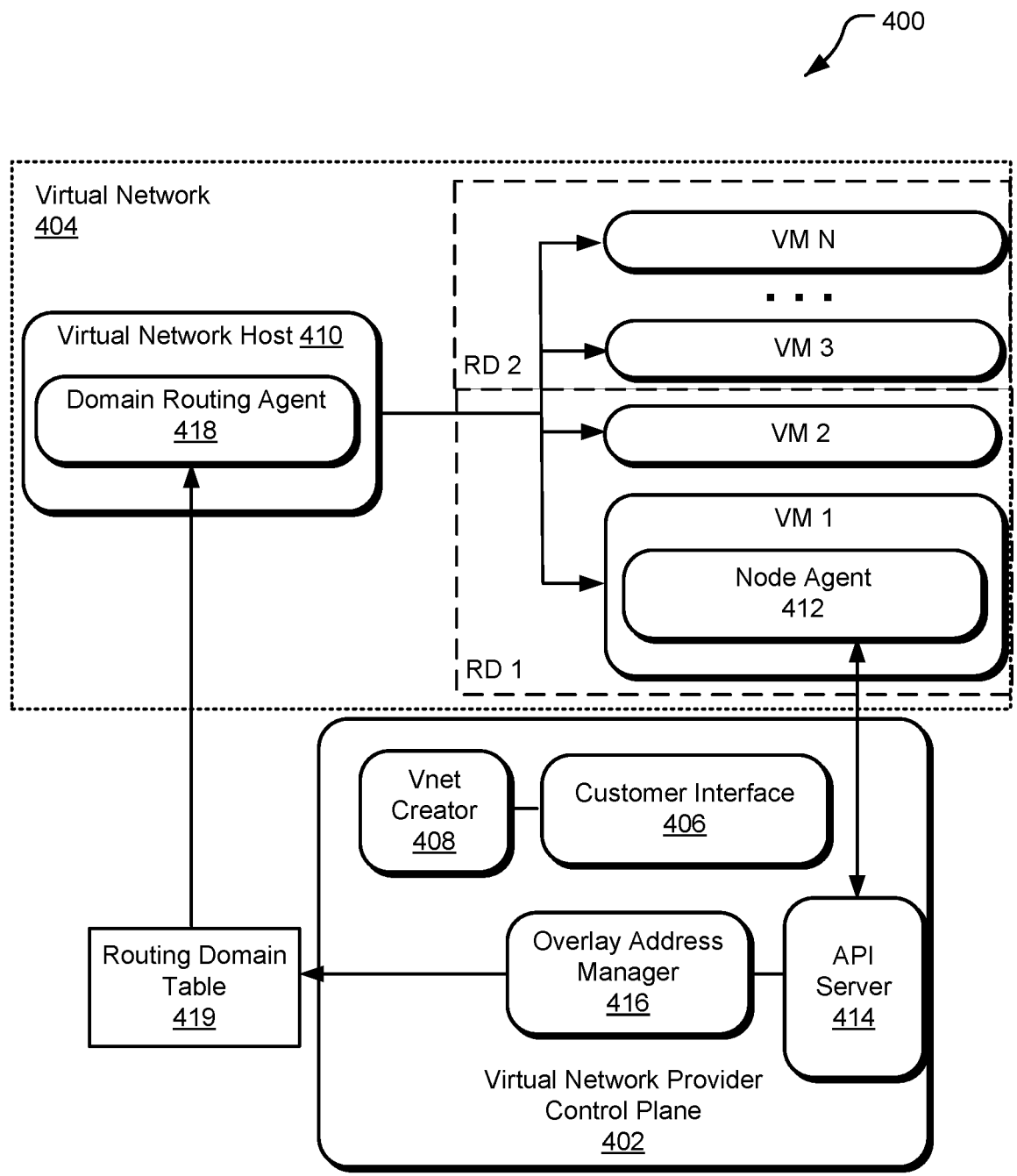
FIG. 4 illustrates aspects of an example virtual network provider system that uses routing domains to define a highly scalable overlay address scheme that supports messaging between containers instantiated in a virtual network.

FIG. 4 illustrates aspects of an example virtual network provider system 400 that uses routing domains to define a highly scalable overlay address scheme that supports messaging between containers instantiated within a virtual network. The virtual network provider system 400 includes a virtual network provider control plane 402 that performs configuration and control actions on for multiple different virtual networks hosted by the virtual network provider system 400 on behalf of various customers. To illustrate a division of roles between various processing entities in the virtual network provider system 400, FIG. 4 illustrates a single virtual network 404.

The virtual network provider control plane 402 includes a virtual network (Vnet) creator 408 that performs configuration actions to initially set up a virtual network. To request creation of the virtual network 404, a customer interacts with a customer interface 406 of the virtual network provider control plane 402. The customer interface 406 is, for example, a web-based portal with a UI that allows the customer to specify various parameters of interest such as how many virtual machines to create in the virtual network 404 and/or to specify the creation of clusters that act as independent routing domains (a fact that may or may not be apparent to the end customer). Although FIG. 4 shows the customer interface 406 and Vnet creator 408 as part of the virtual network provider control plane 406, it is to be understood that some implementations may include different control planes that perform the roles of initial Vnet/cluster configuration and overlay address management, respectively.

In some implementations, the customer interface 406 also includes controls that allow a user to add or remove virtual machines and/or entire clusters (e.g., routing domains and their respective VMs) within an already-existing virtual network. In response to customer inputs received through the customer interface (e.g., a user interface (UI), the Vnet creator 408 instantiates and configure various virtual machines and assigns IP addresses of an underlay addresses scheme to the virtual machines. The Vnet creator 408 may also perform other configuration actions such as updating tables used by routers and switches of the virtual network provider system 400 to map the underlay addresses of the underlay address scheme to physical endpoints. The Vnet creator 408 also creates and/or assigns a virtual network host 410 to the virtual network 404.

In one implementation, the customer provides input to the customer interface 406 to set up a "cluster" of virtual resources to collectively perform various tasks of an individual workload. For example, the customer may specify a set number of VMs and/or desired quantit(ies) of resources, such as desired memory allocation and/or storage space for the cluster. In response, the Vnet creator 408 creates all of the virtual machines of the cluster in association with a same cluster ID. This cluster ID identifies a unique "routing domain" of the virtual network 404, where "routing domain" is defined in a manner consistent with other examples provided herein. Illustrating this, FIG. 4 shows that VM 1 and VM2 are allocated to a first routing domain "RD 1" (e.g., a cluster of resources executing a first customer workload) and the remaining VMs in the virtual network 404 are allocated to a second routing domain "RD 2" (e.g., another cluster of resources executing a second customer workload).

In one implementation, the Vnet creator 408 creates routing domains within the virtual network 404 in the above manner, one-by-one, in response to each of multiple cluster creation requests from a customer. In some implementations, the customer interface 406 provides controls that allow the customer to create multiple identical clusters in parallel (e.g., each being associated with a different routing domain), such as to execute parallel instances of a same customer workload.

When a new virtual machine (e.g., VM1) is created, in the virtual network, a node agent on the virtual machine (e.g., node agent 412) broadcasts a routing domain ID of the virtual machine (e.g., RD 1) along with the IP address of the virtual machine to an API server 414 of the virtual network provider control plane 402. This broadcast is received by an overlay address manager 416 within the virtual network provider control plane 402.

For each routing domain ID, the overlay address manager 416 allocates a block of overlay addresses (e.g., a routing domain CIDR block). The overlay address manager 416 further assigns a subblock of these addresses to each newly-detected virtual machine that is associated with the routing domain ID. Assignment of the overlay addresses to the individual virtual machines on the virtual network is performed in a manner the same or similar to that discussed with respect to FIG. 1-3 above. The overlay address manager 416 publishes the assignment of the overlay addresses to the routing domains and individual virtual machines into a routing domain table 419, which may include information the same or similar to the routing domain table 201 of FIG. 2. The routing domain table 419 is viewable (e.g., via subscription or otherwise) to a domain routing agent 418 executing on the virtual network host 410 in the virtual network 404. The domain routing agent 418 performs routing actions for the virtual network 404 consistent with those discussed elsewhere herein. Specifically, these actions support use of the overlay address scheme to transmit intra-domain messages to containers executing on the virtual machines within the virtual network while prohibiting use of the overlay address scheme to transmit inter-domain messages within the virtual network.

After assigning the subblock of overlay addresses to VM 1 and publishing this information to the routing domain table 419, the overlay address manager 416 broadcasts the subblock of overlay addresses that it has assigned to VM 1 over the API server 414. The node agent 412 on VM 1 receives this broadcast and self-manages assignments of these overlay addresses to containers that are instantiated on VM 1 in the future. In one implementation, the overlay address manager 416 of the virtual network provider control plane 402 lacks visibility into how VM 1 has assigned its overlay addresses and which of the assigned addresses are in use at any given point in time.

In one implementation, the virtual network provider control plane 402 services all virtual networks supported by the virtual network provider by performing actions the same or similar to those described above on behalf of all of the customers of the virtual network provider system 400. Particular aspects of the virtual network provider system 400 and/or its overlay address scheme that are not explicitly discussed above may be considered the same or similar to other example systems and address schemes provided herein.

Figure 5:
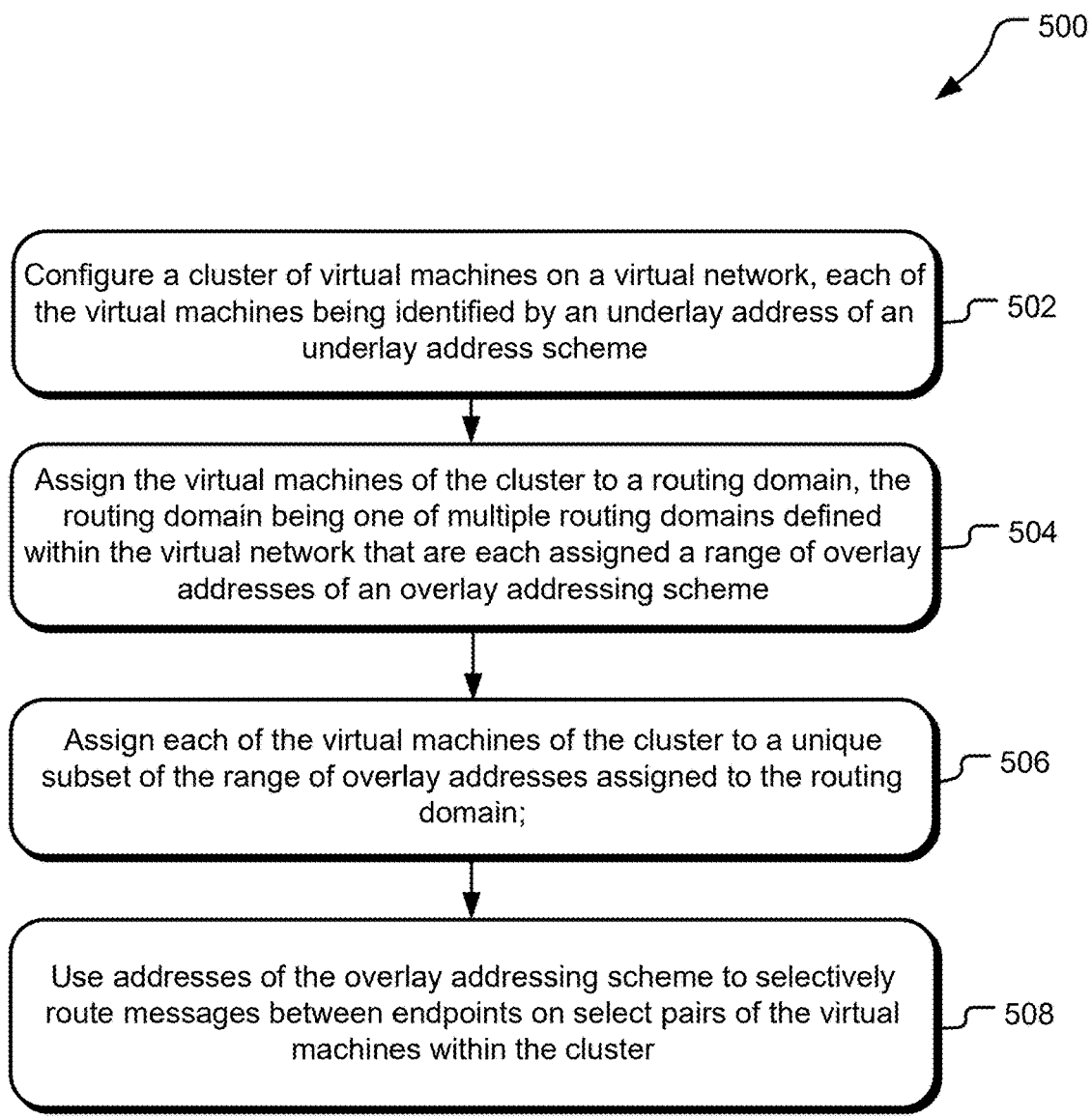
FIG. 5 illustrates example operations for implementing a highly-scalable overlay addressing scheme that facilitates communications between containers instantiated on virtual machines of a virtual network.

FIG. 5 illustrates example operations 500 for implementing a highly-scalable overlay addressing scheme that facilitates communications between containers instantiated on virtual machines of a virtual network. A configuration operation 502 performs actions for configuring a cluster of virtual machines, such as in response to receipt of a user request to create the cluster to support a customer workload. Each of the virtual machines in the cluster is assigned an underlay address (e.g., an IP address) of an underlay address scheme that is known to the various programmable hardware components that perform routing actions on behalf of the virtual network, such as servers, routers, and switches.

A first assignment operation 504 assigns the cluster and all of its virtual machines to a routing domain. The routing domain is one of multiple routing domains defined within the virtual network. Each of the routing domains defined within the virtual network is assigned as range of overlay addresses of an overlay address scheme. In one implementation, two or more of the different routing domains within the virtual network are assigned to the same or to overlapping ranges of the overlay addresses.

A second assignment operation 506 assigns each of the virtual machines of the cluster a unique subset of the range overlay addresses that were assigned, per the first assignment operation 504, to the routing domain. In one implementation, each virtual machine within the network is configured to assign select individual overlay addresses to containers that it instantiates. The overlay address assigned to each container is selected from the range of overlay addresses assigned, per assignment operation 504, to the virtual machine hosting the container.

A message routing operation 508 uses addresses of the overlay addressing scheme to selectively route messages between endpoints on select pairs of the virtual machines within the cluster. For example, the overlay addressing scheme is used to transmit messages between containers executing on the same or different virtual machines in the cluster that are all within the same routing domain. In one implementation, the operations 500 includes further routing operations that support routing of messages across routing domain boundaries when the "To" field of the message header includes a valid address of the underlay addressing scheme but not when the "To" field includes an address of the overlay addressing scheme.

Figure 6:
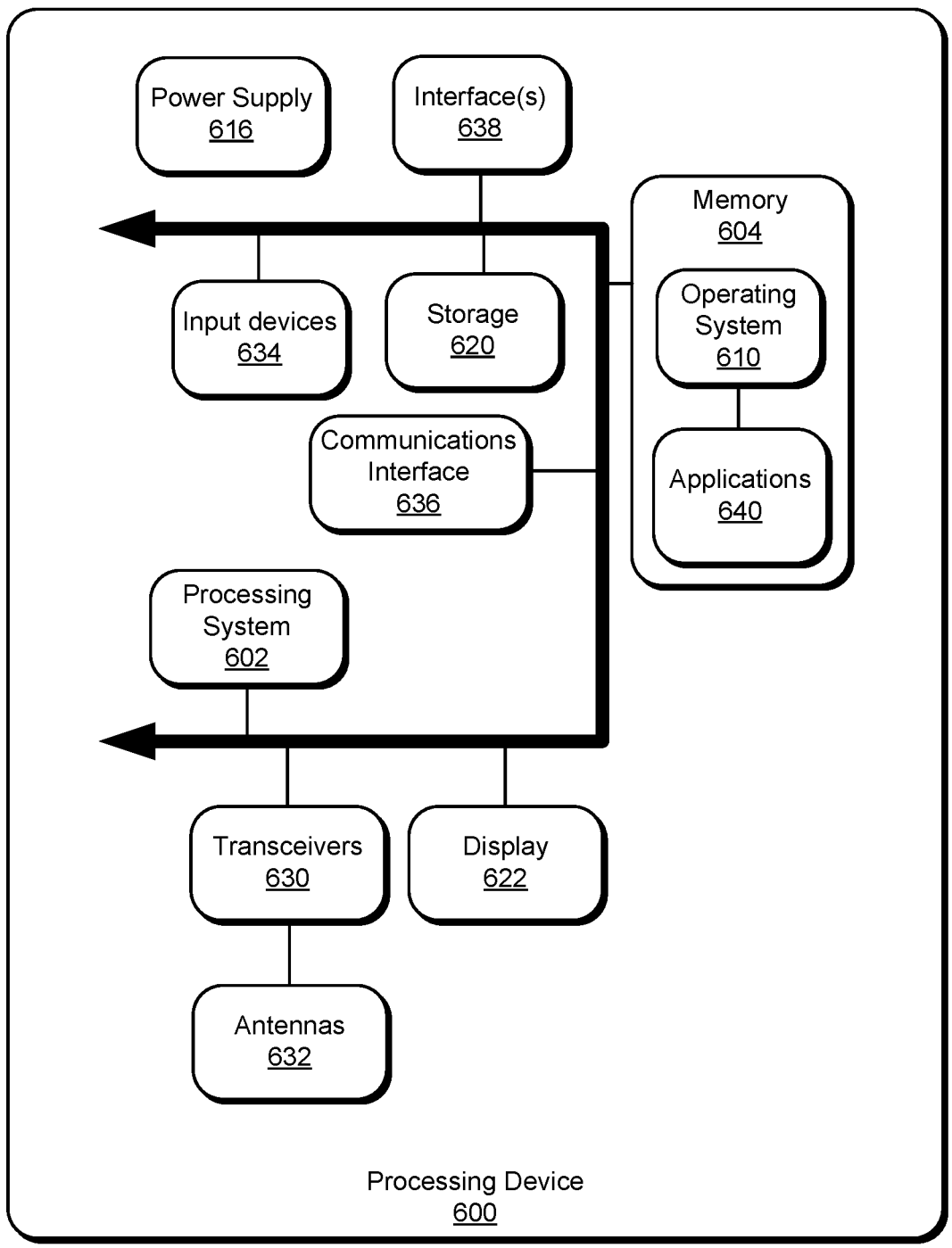
FIG. 6 illustrates an example schematic of a processing device suitable for implementing aspects of the disclosed technology

FIG. 6 illustrates an example schematic of a processing device 600 suitable for implementing aspects of the disclosed technology. In one implementation, the processing device 600 is a physical server that hosts aspects of a virtual network, such as a virtual network host or one or more virtual machines. In another implementation, the processing device 600 is a physical server that performs other operations on behalf a virtual network provider, such as operations to create virtual networks and/or assign addresses to virtual machines in virtual networks.

The processing device 600 includes a processing system 602, memory device(s) 604, the display 566, and other interfaces 608 (e.g., buttons). The memory device(s) 604 generally includes both volatile memory (e.g., RAM) and non-volatile memory (e.g., flash memory). An operating system 610 may reside in the memory device(s) 604 and be executed by the processing system 602. One or more applications 612, such a domain routing agent 106, Node Agent 412, overlay address manager 416, Vnet creator 408, or API server 414, may be loaded in the memory and executed on the operating system 610 by the processing system 602.

The processing device 600 includes a power supply 616, which is powered by one or more batteries or other power sources and which provides power to other components of the processing device 600. Additionally, the processing device 600 includes one or more communication transceivers 630 and an antenna 632 to provide network connectivity (e.g., a mobile phone network, Wi-Fi®, BlueTooth®). The processing device 600 may be further coupled to various input devices 634 such as a microphone, keyboard, touch display, etc. In an implementation, an installation script generation engine, along with other various applications and other modules and services, are embodied by instructions stored in memory device(s) 604 and/or storage devices 628 and processed by the processing system 602. The memory device(s) 604 may be memory of host device or of an accessory that couples to a host. The installation script generation engine my include a trained multi-layer neural network that is saved in the memory device(s) 604 or saved in memory of one or more other compute devices (e.g., various interconnected processing nodes) that are communicatively coupled to the processing device 600, such as via the internet.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The following summary provides a non-exhaustive set of illustrative examples of the technology set forth herein. (A1) According to a first aspect, some implementations include a method for routing traffic within a virtual network. The method includes configuring a group of virtual machines on a virtual network and assigning each of the virtual machines of the cluster to a routing domain. Each of the virtual machines is identified by an underlay address of an underlay addressing scheme, and the routing domain is one of multiple routing domains defined within the virtual network that are each assigned a range of overlay addresses of an overlay addressing scheme. At least two of the multiple routing domains are assigned to ranges of the overlay addresses that overlap. The method further includes assigning each of the virtual machines of the cluster to a unique subset of the range of overlay addresses assigned to the routing domain and using addresses of the overlay addressing scheme to selectively route messages between endpoints on select pairs of the virtual machines within the cluster.

(A2) In some implementations of A1, at least two of the virtual machines within different routing domains of the virtual network are assigned to overlapping ranges of the overlay addresses.

The methods of A1 and A2 are advantageous because they allow identical overlay addresses to be used to address containers on virtual machines within different routing domains of the same virtual network, providing millions of addressable endpoints that that are capable with communicating with other endpoints in the same routing domain.

(A3) In some implementations of A1 and A2, the range of overlay addresses assigned to each virtual machine in the cluster is unique within the cluster.

The method of A3 is advantageous because it provides for a scheme of overlay addresses that is unique within a cluster, which may be assigned to perform tasks related to a common workload. Thus, the cluster can work independent of all other clusters in the virtual network and still have millions of addressable endpoints.

(A4) In some implementations of A1-A3, the method further comprising assigning each container instantiated on a select virtual machine an individual one of the overlay addresses in the unique subset of overlay addresses assigned to the virtual machine.

(A5) In some implementations of A1-A4, comprises selectively routing the message between the endpoints on select pairs of the virtual machines further comprises: directing a message originating at a source virtual machine to a virtual network host of the virtual network; determining at the virtual network host that a destination address of the message that is within the range of overlay addresses assigned to a routing domain that the source virtual machine belongs to; identifying, at the virtual network host, a destination virtual machine of the multiple of virtual machines in the virtual network; and routing the message to the destination virtual machine. In these implementations, the destination virtual machine belongs to the routing domain and is assigned a range of overlay addresses that includes the destination address.

(A6) In some implementations of A1-A5, the method further comprises identifying an underlay address of the destination virtual machine; based on the underlay address, identifying an IP address for a physical server hosting the destination virtual machine; and transmitting the message to the physical server hosting the destination virtual machine.

(A7) In some implementations of A1-A6, selectively routing the message between the endpoints further comprises identifying, at the destination virtual machine, a container that is assigned to the destination address; and directing the message to the container.

(A8) In some implementations of A1-A7, the messages do not reference addresses of the underlay addressing scheme.

In yet another aspect, some implementations include a computing system for routing traffic within a virtual network. The computing system includes hardware logic circuitry that is configured to perform any of the methods described herein (e.g., methods A1-A8).

In yet another aspect, some implementations include a computer-readable storage medium for storing computer-readable instructions. The computer-readable instructions, when executed by one or more hardware processors, perform any of the methods described herein (e.g., methods A1-A8).

According to another aspect, some implementations include a system for routing traffic within a virtual network. The system includes a means for configuring a group of virtual machines on a virtual network and a means for assigning each of the virtual machines of the cluster to a routing domain. Each of the virtual machines is identified by an underlay address of an underlay addressing scheme, and the routing domain is one of multiple routing domains defined within the virtual network that are each assigned a range of overlay addresses of an overlay addressing scheme. At least two of the multiple routing domains are assigned to ranges of the overlay addresses that overlap. The method further includes a means for assigning each of the virtual machines of the cluster to a unique subset of the range of overlay addresses assigned to the routing domain and using addresses of the overlay addressing scheme to selectively route messages between endpoints on select pairs of the virtual machines within the cluster.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
    configuring a cluster of virtual machines on a virtual network, each of the virtual machines being identified by an underlay address of an underlay addressing scheme;
    assigning each of the virtual machines of the cluster to a routing domain, the routing domain being one of multiple routing domains defined within the virtual network that are each assigned a range of overlay addresses of an overlay addressing scheme, at least two of the multiple routing domains being assigned to ranges of the overlay addresses that overlap;
    assigning each of the virtual machines of the cluster to a unique subset of the range of overlay addresses assigned to the routing domain; and
    using addresses of the overlay addressing scheme to selectively route messages between endpoints on select pairs of the virtual machines within the cluster.

2. The method of claim 1, wherein at least two of the virtual machines within different routing domains of the virtual network are assigned to overlapping ranges of the overlay addresses.

3. The method of claim 1, wherein the range of overlay addresses assigned to each virtual machine in the cluster is unique within the cluster.

4. The method of claim 1, further comprising: for a select virtual machine of the virtual machines in the cluster, assigning each container instantiated on the select virtual machine an individual one of the overlay addresses in the unique subset of overlay addresses assigned to the virtual machine.

5. The method of claim 1, wherein selectively routing the message between the endpoints on select pairs of the virtual machines further comprises:

directing a message originating at a source virtual machine to a virtual network host of the virtual network;

at the virtual network host:

determining that a destination address of the message is within the range of overlay addresses assigned to a routing domain that the source virtual machine belongs to;

in response to the determining, identifying a destination virtual machine of the multiple of virtual machines in the virtual network, the destination virtual machine belonging to the routing domain and being assigned a range of overlay addresses that includes the destination address; and routing the message to the destination virtual machine.

6. The method of claim 5, further comprising:

identifying an underlay address of the destination virtual machine;

based on the underlay address, identifying an IP address for a physical server hosting the destination virtual machine; and transmitting the message to the physical server hosting the destination virtual machine.

7. The method of claim 5, wherein selectively routing the message between the endpoints further comprises:

at the destination virtual machine, identifying a container that is assigned to the destination address; and directing the message to the container.

8. The method of claim 1, wherein the messages do not reference addresses of the underlay addressing scheme.

9. A system comprising:

a plurality of virtual machines on a virtual network, each virtual machine on the virtual network being assigned to an underlay address of an underlay addressing scheme;

a plurality of routing domains each including a different subset of the virtual machines of the virtual network, each of the routing domains being assigned to a range of overlay addresses of an overlay addressing scheme, the assigned range of overlay addresses being allocated among the subset of the virtual machines in the routing domain and being overlapping for at least two of the routing domains of the virtual network, a virtual network host configured to:

access a first mapping associating a domain identifier with each virtual machine of the virtual machines, the domain identifier identifying a select one of the routing domains that the virtual machine belongs to;

access a second mapping associating a range of overlay addresses with each of the virtual machines, the range of overlay addressees assigned to each virtual machine being a subset of the range assigned to the routing domain that the virtual machine belongs to; and use addresses of the overlay addressing scheme to selectively route messages between endpoints residing on select pairs of the virtual machines belonging to a same routing domain of the plurality routing domains.

10. The system of claim 9, wherein the range of overlay addresses assigned to each of the virtual machines in the virtual network is unique for each of the virtual machines belonging to a same one of the routing domains.

11. The system of claim 9, wherein one or more of the virtual machines assigned to different routing domains are assigned to ranges of the overlay addresses that overlap one another.

12. The system of claim 9, wherein the virtual network host is further configured to:

receive a message originating at a source virtual machine of the virtual network;

determine that a destination address of the message that is within the range of overlay addresses assigned to a routing domain that the source virtual machine belongs to;

in response to the determining, identify a destination virtual machine of the plurality of virtual machines in the virtual network, the destination virtual machine belonging to the routing domain and being assigned a range of overlay addresses that includes the destination address; and route the message to the destination virtual machine.

13. The system of claim 9, further comprising:

a plurality of containers, each of the containers executing on a select virtual machine of the virtual machines in the virtual network being assigned to an individual one of the overlay addresses within the range of overlay addresses assigned to the select virtual machine.

14. The system of claim 12, where the destination virtual machine is configured to:

identify a container that is assigned to the destination address and executing on the destination virtual machine; and direct the message to the container.

15. A system comprising:

a plurality of virtual machines on a virtual network, each virtual machine on the virtual network being assigned to an underlay address of an underlay addressing scheme;

a plurality of routing domains each including a different subset of the virtual machines of the virtual network, each of the routing domains being assigned to a range of overlay addresses of an overlay addressing scheme, the assigned range of overlay addresses being allocated among the subset of the virtual machines in the routing domain and being overlapping for at least two of the routing domains of the virtual network; and a virtual network host configured to use addresses of the overlay addressing scheme to selectively route messages between endpoints on select pairs of the virtual machines assigned to a same routing domain of the plurality of routing domains.

16. The system of claim 15, wherein the virtual network host is further configured to intercept a message sent from a first virtual machine in the virtual network, the message having a header identifying a non-routable destination address;

determine a source routing domain that the first virtual machine belongs to;

determine whether the non-routable destination address exists within the source routing domain; and responsive to confirming that the non-routable destination address exists within the source routing domain, forward the message to a destination virtual machine associated in memory with the non-routable destination address and the source routing domain.

17. The system of claim 15, wherein the range of overlay addresses assigned to each of the virtual machines in the virtual network is unique for each of the virtual machines belonging to a same one of the routing domains.

18. The system of claim 15, wherein one or more of the virtual machines assigned to different routing domains are assigned to ranges of the overlay addresses that overlap one another.

19. The system of claim 16, wherein the message originates at a container on the first virtual machine, the container being uniquely identified within the source routing domain by a source overlay address defined within the overlay address scheme.

20. The system of claim 16, wherein the non-routable destination address is assigned to a container executing on the destination virtual machine.

\* \* \* \* \*